2,865,927
2-ALKOXY-2-IMIDAZOLINES AND METHOD OF MAKING SAME

Cornelius K. Cain, Flourtown, Pa., assignor to McNeil Laboratories, Incorporated, Philadelphia, Pa., a corporation of Pennsylvania No Drawing. Application June 25, 1957
Serial No. 667,974

15 Claims. (Cl. 260—309.6)

The present invention relates to novel chemical compounds, and more particularly, it relates to novel 2-alkoxy-2-imidazolines. More specifically, this invention relates to novel 2-alkoxy-2-imidazolines and salts thereof possessing valuable therapeutic properties, and to a method of making the same.

It is the principal object of the present invention to provide novel chemical compounds possessing valuable pharmaceutical properties.

It is another object of the present invention to provide a method of making novel compounds which are therapeutically beneficial.

These and other objects will become apparent from a consideration of the following specification and claims.

The compounds of the present invention are 2-alkoxy-2-imidazolines selected from 2-alkoxy-2-imidazolines where the alkoxy radical contains from 1 to 8 carbon atoms and acid addition salts thereof.

In the form of the free base, the present 2-alkoxy-2-imidazolines correspond to the structure

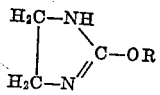

where R is an alkyl radical (either straight or branched chain) containing from 1 to 8 carbon atoms. Preferably R is an alkyl radical containing from 1 to 4 carbon atoms.

These compounds have been found to possess valuable therapeutic properties including the property of acting as central nervous system stimulants in a manner resembling nicotinic type stimulants, and hence may be utilized in a manner conventional with known central nervous system stimulants of this type.

Illustrative of the presently provided 2-alkoxy-2-imidazolines where the alkoxy radical contains from 1 to 8 carbon atoms are 2-methoxy-2-imidazoline, 2-ethoxy-2-imidazoline, 2-n-propoxy-2-imidazoline, 2-isopropoxy-2-imidazoline, 2-n-butoxy-2-imidazoline, 2-isobutoxy-2-imidazoline, 2-n-pentoxy-2-imidazoline, 2-isopentoxy-2-imidazoline, 2-hexoxy-2-imidazoline, 2-(2,4-dimethylpentoxy)-2-imidazoline, 2-octoxy-2-imidazoline, 2-isooctoxy-2-imidazoline and the like.

The 2-alkoxy-2-imidazolines possess basic properties enabling them to form addition salts with acids. Hence these compounds may be prepared and/or employed either as the free base or as such salt. The acid forming the salt may be any inorganic or organic acid desired, such as hydrochloric, hydrobromic, hydroiodic, nitric, sulphuric, phosphoric and the like; acetic, propionic, caproic, stearic, and other acids of this series, and the like; crotonic, fumaric, oleic, citric, tartaric, lactic, maleic, benzoic, naphthoic, salicylic, methane sulphonic, camphor sulphonic, and the like. The normal salts as well as the acid salts may be employed. The preferred salts are the fumarate, hydrogen fumarate, maleate, sulphate, and hydrochloride. Because the salts are equivalent to the free base, where reference is made herein to the 2-alkoxy-2-imidazolines or to specific members of this class, it will be understood to include the addition salts unless the reference is otherwise qualified.

If a salt is to be administered, the salt will be pharmaceutically acceptable, and any toxicity or other undesirable effects which may be imparted by the salt-forming acid should be taken into consideration, as is well known in the art. Pharmaceutically useful salts should not be substantially more toxic than the base compound itself and should be able to be incorporated in liquid or solid pharmaceutical media for the preparation of therapeutically useful compositions. The salts for administration will be "non-toxic" as that term is understood in the art to refer to salts which, upon administration at levels sufficient to produce the desired effect, do not produce any substantial deleterious side effects.

The presently provided novel 2-alkoxy-2-imidazolines may be prepared by the reaction of one mole of a 2-alkylmercapto-2-imidazoline with one mole of an alcohol, whereby the alkoxy radical of the alcohol replaces the alkylmercapto radical of the 2-alkylmercapto-2-imidazoline, forming the 2-alkoxy-2-imidazoline, as illustrated by the following equation:

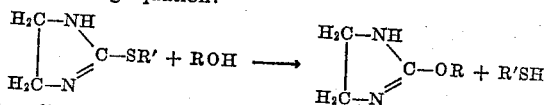

An alkanethiol, represented by R'SH, is formed as a by-product in the reaction.

In the alcohol represented by ROH in the above equation, R represents an alkyl radical of from 1 to 8, preferably from 1 to 4 carbon atoms, as defined hereinabove. Illustrative of presently useful alcohols are methyl alcohol, ethyl alcohol, n-propyl alcohol, isopropyl alcohol, isobutyl alcohol, diisobutyl alcohol, isooctyl alcohol, and the like. In the 2-alkylmercapto-2-imidazoline, the alkyl radical represented by R' in the above equation is an alkyl radical which may contain up to 8 carbon atoms, but for the sake of economy is preferably a lower alkyl radical containing 1 to 4 carbon atoms.

The 2-alkylmercapto-2-imidazolines are well known compounds which are readily prepared, for example, by reaction of ethylenethiourea with an alkyl halide. 2-alkylmercapto-2-imidazolines which may be employed in the present method of preparing 2-alkoxy-2-imidazolines include, for example, 2-methyl-mercapto-2-imidazoline, 2-ethylmercapto - 2 - imidazoline, 2 - isopropylmercapto - 2 - imidazoline, 2 - n - butylmercapto - 2 - imidazoline, 2 - hexylmercapto - 2 - imidazoline, 2 - (2,4 - dimethylhexylmercapto) - 2 - imidazoline, and so forth, 2 - methylmercapto - 2 - imidazoline being preferred.

The proportions of the 2-alkylmercapto-2-imidazoline and alcohol in the reaction mixture are not critical, and either of the two reactants may be present in excess if desired, as determined by considerations of economics and convenience. However, the stoichiometry of the reaction, as illustrated by the above equation, requires equimolar quantities of each reactant for the formation of the resulting ether.

The reaction preferably takes place in a solvent for the reactants. Particularly preferred as such solvent is an excess of the alcohol employed as a reactant. Alternatively, or additionally if desired, there may be employed an inert solvent such as benzene, toluene, xylene, diethyl ether, diphenyl ether, ethylene glycol diethyl ether, and the like.

Preferably the reaction is carried out in the presence of at least a catalytic amount of a base. Any alkali metal base or alkaline earth metal base such as sodium hydroxide, potassium hydroxide, calcium hydroxide, sodium carbonate and the like may be employed; or alternatively, there may be employed as such base an organic compound such as an amine which may be, for example, diethylamine, triethylamine, N-methylmorpholine or dimethylaniline; or a quaternary ammonium hydroxide such as benzyltrimethyl ammonium hydroxide and similar organic bases. Particularly effective and preferred as the basic component in reactions conducted in accordance with this invention is an alkali metal base comprising the alkali metal derivative of the alcohol undergoing the reaction, such as sodium methoxide, sodium ethoxide and the like. The reaction is catalyzed by the presence of even very small amounts of base, but desirably may be conducted in the presence of a quantity of base which is a molar equivalent of the amount of imidazoline compound present. Even higher proportions of base, up to twice the molar equivalent of the imidazoline compound, may be employed if desired, but generally no advantage is to be gained thereby.

The temperature of the reaction may vary widely, from room temperature up to about 200° C. Preferably the reaction is conducted at the reflux temperature of the reaction mixture. A preferred temperature range is from 65° to 120°. Super- or subatmospheric pressures may be applied if desired, but generally ordinary atmospheric pressures are satisfactory. The time required for completion of the reaction depends on reaction conditions such as the temperature and the nature of the alcohol and the 2-alkylmercapto-2-imidazoline. Completion of the reaction is easily detected by cessation of the evolution of the alkanethiol formed in the reaction. On completion of the reaction, the present compounds can be isolated and purified following conventional procedures. Conveniently, solvent and any unreacted starting materials are removed by evaporation under reduced pressure. The residue is dissolved in water, and extracted with a suitable organic solvent such as methylene chloride, chloroform, benzene, diethyl ether and the like; by evaporation of the resulting solution, the crude product is isolated.

For purification, if desired, the crude product, in solution in an organic solvent such as those mentioned above, may be treated with an adsorbent, such as alumina, activated carbon or the like, or with an ion exchange resin to separate contaminants therefrom. Alternatively or additionally the crude product is advantageously converted to an acid addition salt thereof and purified by recrystallization. In general, the desired products are more soluble in organic solvents, such as petroleum ether, diethyl ether and heptane, than are byproducts formed therewith, and this property may be employed to separate the presently provided alkoxyimidazolines from associated byproducts by fractional crystallization.

The purified product may be prepared for pharmaceutical administration by admixture with a suitable liquid or solid pharmaceutical carrier to provide a solution, suspension, capsule or tablet. Suitable pharmaceutical carriers in this connection are water, oils, alcohols, and glycols or the like, in the case of a solution or suspension; or gelatin, starch, sugars, inorganic salts, lubricants and the like, in the case of a tablet or capsule. Tablets are the preferred form for oral administration. For parenteral administration the compound will be mixed with one of the stated liquid vehicles.

The present invention will be more readily understood from a consideration of the following specific examples which are given for the purpose of illustration only and are not intended to limit the scope of the invention in any way.

*Example 1*

A solution of sodium methoxide, prepared by dissolving 4.6 g. (0.2 mole) of sodium in 150 cc. of anhydrous methyl alcohol, is mixed with a solution of 23 g. (0.2 mole) of 2-methylmercapto-2-imidazoline in 150 cc. of absolute methyl alcohol and the resulting mixture is refluxed for 18 hours. The alcohol is removed by distillation and the residue is dissolved in a small volume of water. The aqueous solutions extracted with methylene chloride. The methylene chloride extract is evaporated and the residue recrystallized from an acetone-heptane mixture to give 2-methoxy-2-imidazoline, M. P. 71–73° C. The calculated nitrogen content for $C_4H_8N_2O$ is N, 28.0%; that found is 27.7%.

*Example 2*

A 1 g. (0.01 mole) sample of 2-methoxy-2-imidazoline is dissolved in methyl alcohol and the solution treated with 1.16 g. (0.01 mole) of fumaric acid. Addition of ether results in the precipitation of 2-methoxy-2-imidazoline fumarate, which may be purified by recrystallization from a mixture of methanol and ether, M. P. 136–139° C. The calculated composition for $C_8H_{12}N_2O_5$ is: C, 44.4%; H, 5.6%; N, 13.0%; that found is C, 44.7%; H, 5.5%; N, 13.3%.

*Example 3*

A mixture of 11 g. (0.1 mole) of 2-methylmercapto-2-imidazoline and a solution of sodium ethoxide prepared by dissolving 3.8 g. (0.16 mole) of sodium in 100 cc. of absolute ethyl alcohol is refluxed for 50 hours. The alcohol is removed by vacuum distillation and the residue is dissolved in water. The aqueous solution is extracted with chloroform and the chloroform solution is evaporated. The residue is purified by solution in a mixture of petroleum ether and ether, and passage through an alkaline alumina column. Evaporation of the eluate gives 2-ethoxy-2-imidazoline, M. P. 45–50° C.

*Example 4*

A solution of 1.5 g. (0.013 mole) of 2-ethoxy-2-imidazoline in ethyl alcohol is treated with 0.9 g. (0.007 mole) of fumaric acid. Addition of ether results in the precipitation of 2-ethoxy-2-imidazoline fumarate, M. P. 123–125° C. The calculated nitrogen content of $C_9H_{14}N_2O_5$ is N, 12.2%; that found is N, 12.2%.

*Example 5*

A mixture of 11 g. (0.1 mole) of 2-methylmercapto-2-imidazoline and a solution of sodium isopropoxide prepared by dissolving 2.3 g. (0.1 mole) of sodium in 150 cc. of anhydrous isopropyl alcohol is refluxed for 63 hours. The alcohol is removed by vacuum distillation and the residue is dissolved in a mixture of crushed ice and water. The aqueous solution is extracted with methylene chloride and the methylene chloride extract is evaporated. The evaporation residue is dissolved in a mixture of petroleum ether and ether and the solution is passed through an alkaline alumina column. Evaporation of the eluate yields 2-isopropoxy-2-imidazoline, M. P. 65–67° C.

*Example 6*

A mixture of 11 g. (0.1 mole) of 2-methylmercapto-2-imidazoline and a solution of sodium butoxide prepared by dissolving 2.3 g. (0.1 mole) of sodium in 150 cc. of n-butyl alcohol is refluxed for 22 hours. The alcohol is removed by vacuum distillation and the residue is dissolved in a mixture of crushed ice and water. The aqueous solution is extracted with methylene chloride. The methylene chloride extract is evaporated and the residue is purified by passing a solution thereof in a mixture of petroleum ether and ether through an alkaline alumina column. Evaporation of the eluate gives 2-n-butoxy-2-imidazoline, M. P. 55–58° C.

*Example 7*

A solution of 6.2 g. (0.043 mole) of 2-n-butoxy-2-imidazoline in methanol is treated with 4.9 g. (0.043 mole) of fumaric acid. Addition of ether results in the precipitation of 2-n-butoxy-2-imidazoline fumarate, M. P. 126–128° C. The calculated nitrogen content of $C_{11}H_{18}N_2O_5$ is N, 10.85%; that found is N, 10.77%.

Similarly, by the reaction of hexyl alcohol with 2-methylmercapto-2-imidazoline or 2-ethylmercapto-2- imidazoline in the presence of a base, there is prepared 2-hexoxy-2-imidazoline.

By refluxing sodium isooctooxide with 2-methylmercapto-2-imidazoline, there is prepared 2-isooctoxy-2-imidazoline, which on treatment wtih maleic acid forms 2-isooctoxy-2-imidazoline maleate.

Other of the presently provided 2-alkoxy-2-imidazolines and salts thereof are prepared similarly.

While the invention has been described with particular reference to various preferred embodiments thereof, it will be appreciated that modifications and variations may be made, for example, in features such as the nature of the 2-alkylmercapto-2-imidazoline and the quantities of reactants, without departing from the scope of the invention.

What is claimed is:

1. 2-imidazoline compounds selected from the class consisting of 2-alkoxy-2-imidazolines where the alkoxy radical contains from 1 to 8 carbon atoms and the acid addition salts thereof.

2. The compounds of claim 1 where the alkoxy radical contains from 1 to 4 carbon atoms.

3. 2-methoxy-2-imidazoline.

4. 2-ethoxy-2-imidazoline.

5. 2-isopropoxy-2-imidazoline.

6. 2-n-butoxy-2-imidazoline.

7. The method of preparing a 2-alkoxy-2-imidazoline which comprises reacting a 2-alkylmercapto-2-imidazoline with an alcohol.

8. The method which comprises reacting a 2-alkylmercapto-2-imidazoline wherein the alkyl radical of said 2-alkylmercapto-2-imidazoline contains from 1 to 8 carbon atoms with an alcohol, and isolating from the resulting reaction product a 2-alkoxy-2-imidazoline where the alkoxy radical contains from 1 to 8 carbon atoms.

9. The method of claim 8 wherein said reaction is conducted in the presence of a base.

10. The method of claim 9 wherein said base is an alkali metal salt of said alcohol.

11. The method which comprises contacting 2-methylmercapto-2-imidazoline with methyl alcohol and isolating from the resulting reaction product 2-methoxy-2-imidazoline.

12. The method of claim 11 wherein said 2-methoxy-2-imidazoline is further reacted with fumaric acid to provide 2-methoxy-2-imidazoline fumarate.

13. The method which comprises contacting 2-methylmercapto-2-imidazoline with ethyl alcohol and isolating from the resulting reaction product 2-ethoxy-2-imidazoline.

14. The method which comprises contacting 2-methylmercapto-2-imidazoline with isopropyl alcohol and isolating from the resulting reaction product 2-isopropoxy-2-imidazoline.

15. The method which comprises contacting 2-methylmercapto-2-imidazoline with n-butyl alcohol and isolating from the resulting reaction product 2-n-butoxy-2-imidazoline.

No references cited.